US010012287B2

(12) United States Patent
Çiçek et al.

(10) Patent No.: US 10,012,287 B2
(45) Date of Patent: Jul. 3, 2018

(54) POWERTRAIN MECHANISM WITH DRIVE PLATE

(71) Applicant: VALEO OTOMOTIV SANAYI VE TICARET ANONIM SIRKETI, Maltepel/Istanbul (TR)

(72) Inventors: Cihan Çiçek, Osmangazi/Bursa Pk (TR); Olivier Marechal, Amiens (FR); Didier Bagard, Amiens (FR)

(73) Assignee: Valeo Otomotiv Sanayi ve Ticaret Anonim Sirketi, Istanbul (TR)

( * ) Notice: Subject to any disclaimer, the term of this patent is extended or adjusted under 35 U.S.C. 154(b) by 89 days.

(21) Appl. No.: 15/139,013

(22) Filed: Apr. 26, 2016

(65) Prior Publication Data

US 2016/0319900 A1    Nov. 3, 2016

(30) Foreign Application Priority Data

Apr. 30, 2015   (TR) .................................. 2015/05304

(51) Int. Cl.
   *F16D 3/14*        (2006.01)
   *F16F 15/129*     (2006.01)
   (Continued)

(52) U.S. Cl.
   CPC ............ *F16F 15/1297* (2013.01); *F16D 1/06* (2013.01); *F16D 1/10* (2013.01); *F16D 1/116* (2013.01);
   (Continued)

(58) Field of Classification Search
   CPC .. F16F 15/1297; F16F 15/30; F16F 15/12353; F16D 1/116; F16D 1/06;
   (Continued)

(56) References Cited

U.S. PATENT DOCUMENTS

| 3,386,302 | A |   | 6/1968 | Ivanchich |              |
|-----------|---|---|--------|-----------|--------------|
| 5,884,743 | A | * | 3/1999 | Kleifges  | F16F 15/12353 |
|           |   |   |        |           | 192/204      |

(Continued)

FOREIGN PATENT DOCUMENTS

| DE | 102010029306 A1 | 12/2011 |
|----|-----------------|---------|
| EP | 1914433 A2      | 4/2008  |

(Continued)

*Primary Examiner* — Gregory John Binda
(74) *Attorney, Agent, or Firm* — Berenato & White, LLC

(57) ABSTRACT

A powertrain mechanism in a vehicle having an internal combustion engine. The powertrain mechanism is provided for transmitting power from the engine to a gearbox. The mechanism includes at least one drive plate and at least one connection hub. The hub has an assembly section disposed in at least one assembly opening provided in the vicinity of the center of the drive plate. At least one protrusion upper section defines at an uppermost section of at least one protrusion provided mutually on an inner wall of the assembly opening and on an outer wall of the assembly section. At least one recess base defines at a lowermost section of at least one recess wherein the at least one protrusion is at least partially placed. The powertrain mechanism further includes at least one movement gap provided between the protrusion upper section and the recess base.

16 Claims, 4 Drawing Sheets

(51) Int. Cl.
*F16D 1/10* (2006.01)
*F16D 1/06* (2006.01)
*F16F 15/123* (2006.01)
*F16F 15/30* (2006.01)
*F16D 1/116* (2006.01)

(52) U.S. Cl.
CPC ........ *F16F 15/12353* (2013.01); *F16F 15/30* (2013.01); *F16D 2001/102* (2013.01); *F16D 2001/103* (2013.01); *Y10T 403/7033* (2015.01)

(58) Field of Classification Search
CPC ................ F16D 1/10; F16D 2001/102; F16D 2001/103; Y10T 403/7033
USPC ........... 464/68.41, 68.6, 160; 192/204, 214.1
See application file for complete search history.

(56) References Cited

U.S. PATENT DOCUMENTS

| | | | | |
|---|---|---|---|---|
| 6,089,983 A | * | 7/2000 | Lebas | .................. F16F 15/129 |
| | | | | 192/204 |
| 7,478,969 B2 | * | 1/2009 | Kozlowski | .............. F16D 1/104 |
| | | | | 403/359.5 X |

FOREIGN PATENT DOCUMENTS

| | | |
|---|---|---|
| FR | 2918431 | 1/2009 |
| FR | 2918432 | 1/2009 |
| WO | WO0186162 A1 | 11/2001 |

* cited by examiner

POWERTRAIN MECHANISM WITH DRIVE PLATE

CROSS-REFERENCE TO RELATED APPLICATIONS AND CLAIM TO PRIORITY

This application claims priority to Patent Application No. 2015/05304 filed Apr. 30, 2015 in Turkey, the disclosure of which is incorporated herein by reference and to which priority is claimed.

FIELD OF THE INVENTION

The present invention relates to a powertrain mechanism positioned between the crank shaft and gearbox shaft, in order to be used in vehicles with internal combustion engine.

BACKGROUND OF THE INVENTION

In vehicles with internal combustion engine, powertrain mechanisms are utilized between the crank shaft and the gearbox shaft for transmitting the movement, obtained in the engine, to the wheels. Said powertrain mechanisms are designed so as to transmit power and so as to damp the vibrations occurring.

Said powertrain mechanisms have a drive plate which rotates between the fixation plates and the holder plate positioned between the crank shaft and the gearbox shaft. While the holder plate and the fixation plate are preferably connected to the engine, the drive plate is connected to the gearbox. In said embodiment, the holder plate and the fixation plate provided on the engine side are connected to the crank shaft. The drive plate is connected to the gearbox shaft. Accordingly, if the engine shaft and the gearbox shaft are coaxial, the powertrain mechanism functions in a firm manner. However, in practice, it is not possible that the engine shaft and the gearbox shaft are provided in an accurately coaxial manner. This may lead to undesired contact of the drive plate to the other features in the powertrain mechanism during the operation of the drive plate.

As a result, because of all of the abovementioned problems, an improvement is required in the related technical field.

SUMMARY OF THE INVENTION

The present invention relates to a powertrain mechanism, for eliminating the above mentioned disadvantages and for bringing new advantages to the related technical field.

A primary object of the present invention is to provide a powertrain mechanism which can tolerate axial run-out existing between the crank shaft and the gearbox shaft in vehicles having an internal combustion engine.

In order to achieve the abovementioned object and all of the objects which are to be deducted from the detailed description below, the present invention is a powertrain mechanism in order to transfer the power, received from the engine, to the gearbox in vehicles having internal combustion engine and comprising at least one drive plate and at least one connection hub having an assembly section placed into at least one assembly opening provided in vicinity of the center of said drive plate. Accordingly, there is at least one movement gap provided between at least one protrusion upper section defined at the uppermost section of at least one protrusion provided mutually on inner wall of said assembly opening and on outer wall of the assembly section, and at least one recess base defined at the lowermost section of at least one recess wherein said protrusion is at least partially placed. Thus, the axial run-outs, which exist between the engine shaft provided on the engine side, and the gearbox shaft provided on the gearbox side, are tolerated. Depending on this, the undesired contact of the drive plate to the other features inside the powertrain mechanism is prevented.

In an embodiment of the invention, at least one channel is provided in vicinity of the assembly section, and at least one snap ring is placed into said channel. Thus, the removal of the drive plate from the connection hub is prevented.

In an embodiment of the invention, the snap ring is stopped onto the inner wall of the channel from one side, and it is stopped onto the drive plate from the other side. Thus, the forces applied in the connection hub axis are dampened by the snap ring.

In an embodiment of the invention, pluralities of protrusions and recesses are provided.

In an embodiment of the invention, the protrusions and the recesses are provided consecutively on the inner wall and on the outer wall.

In an embodiment of the invention, the protrusions and the recesses are provided in trapezoid tooth form.

In an embodiment of the invention, the drive plate is positioned between a holder plate facing the engine side, and a fixation plate facing the gearbox side.

In an embodiment of the invention, at least one inertia plate is provided between said holder plate and the fixation plates.

In an embodiment of the invention, there is at least one support plate connected to the holder plate.

In an embodiment of the invention, there is at least one friction element positioned between the holder plate and the connection hub. Thus, the connection hub is connected to the other holder plate or to the support plate provided thereon in a controlled manner.

In an embodiment of the invention, there is at least one chamfered section provided on side of the connection hub facing the friction element. Thus, even if there is run-out between the connection hub axis and the center axis of the holder friction element, the friction element and the connection hub are contacted in the desired manner.

In an embodiment of the invention, there is at least one chamfer provided on side of the friction element facing the connection hub.

In an embodiment of the invention, said chamfer is provided on inner edge of the friction element provided in circular form.

DETAILED DESCRIPTION OF THE PREFERRED EMBODIMENT(S)

In this detailed description, the subject matter powertrain mechanism (10) is explained with references to examples without forming any restrictive effect only in order to make the subject more understandable.

Figure 1:
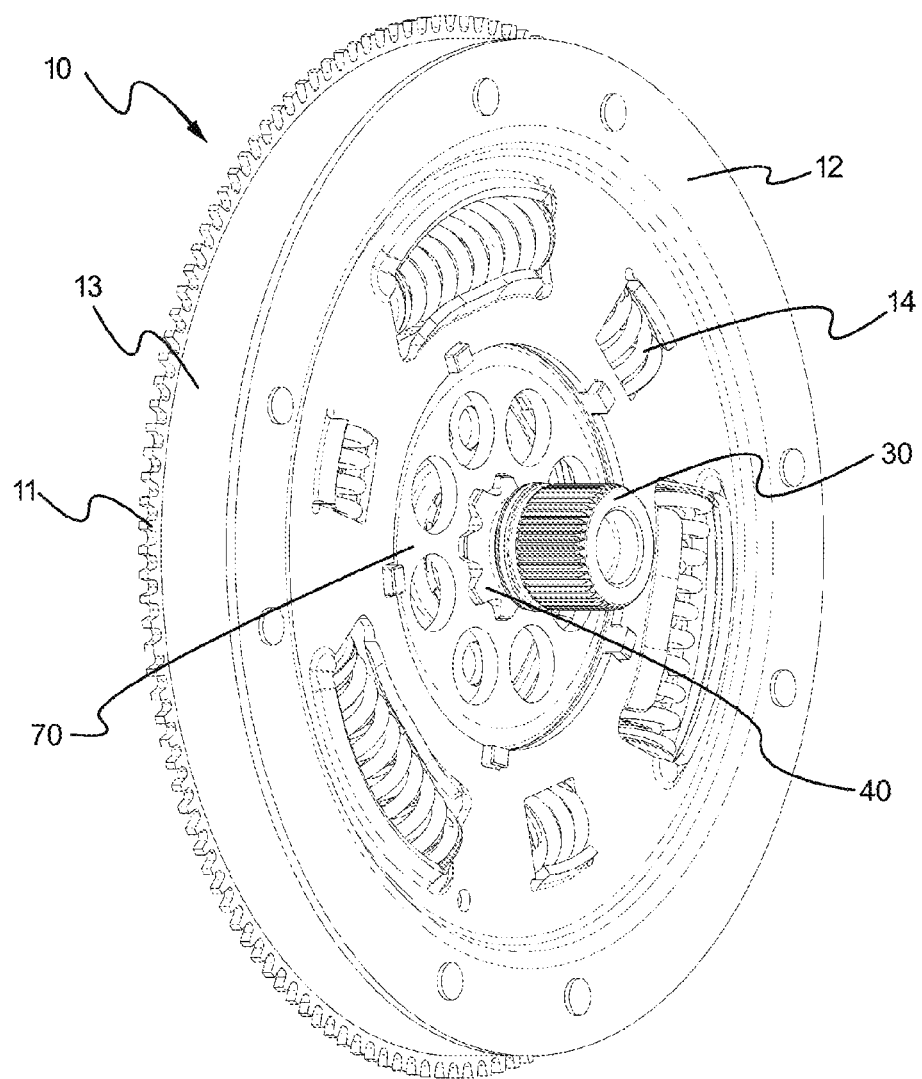
In FIG. 1, a representative isometric view of the subject matter powertrain mechanism is given.
Figure 2:
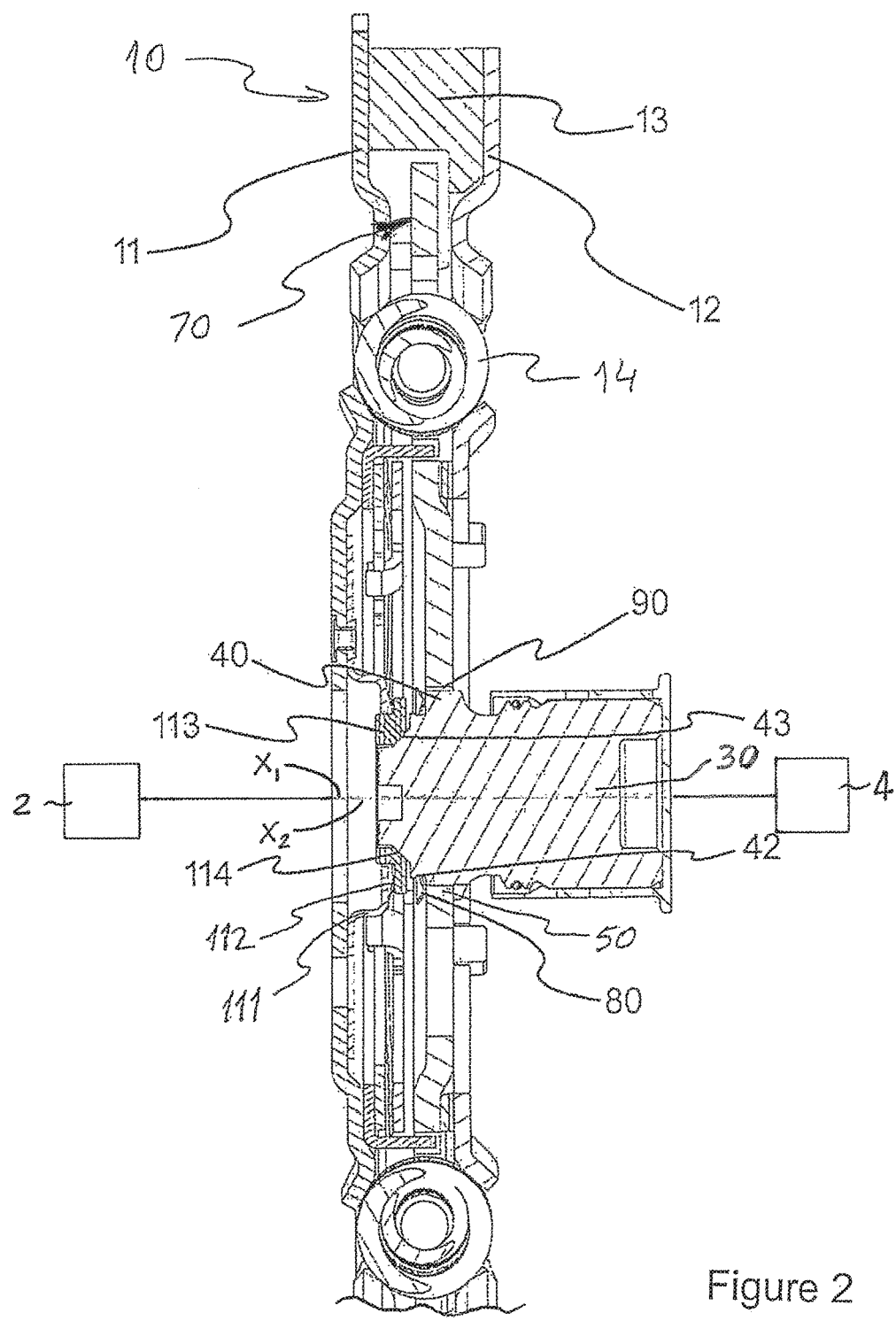
In FIG. 2, an enlarged, partial representative cross sectional view of the subject matter powertrain mechanism is given.

As can be seen in FIGS. 1 and 2, the subject matter powertrain mechanism (10) comprises at least one inertia plate (13) positioned between a holder plate (11) and a fixation plate (12). There is at least one drive plate (70) positioned in a movable manner between said holder plate (11) and said fixation plate (12). Said drive plate (70) is connected to the holder plate (11) and to the fixation plate (12) by using at least one spring (14). The holder plate (11) is connected to a crankshaft of an internal combustion engine (2). The drive plate (70) is connected to an input shaft of a gearbox (4) by means of a connection hub (30). Thus, the holder plate (11) and the fixation plate (12) are rotated by means of the movement applied by the engine (2), and the movement is transferred to the drive plate (70) and to the gearbox (4) by means of springs (14) as a result of the rotation of the holder plate (11) and of the fixation plate (12). In the connection of the holder plate (11) to the crankshaft of the engine (2), there is at least one support plate (111) for increasing the strength of the holder plate (11).

Figure 3:
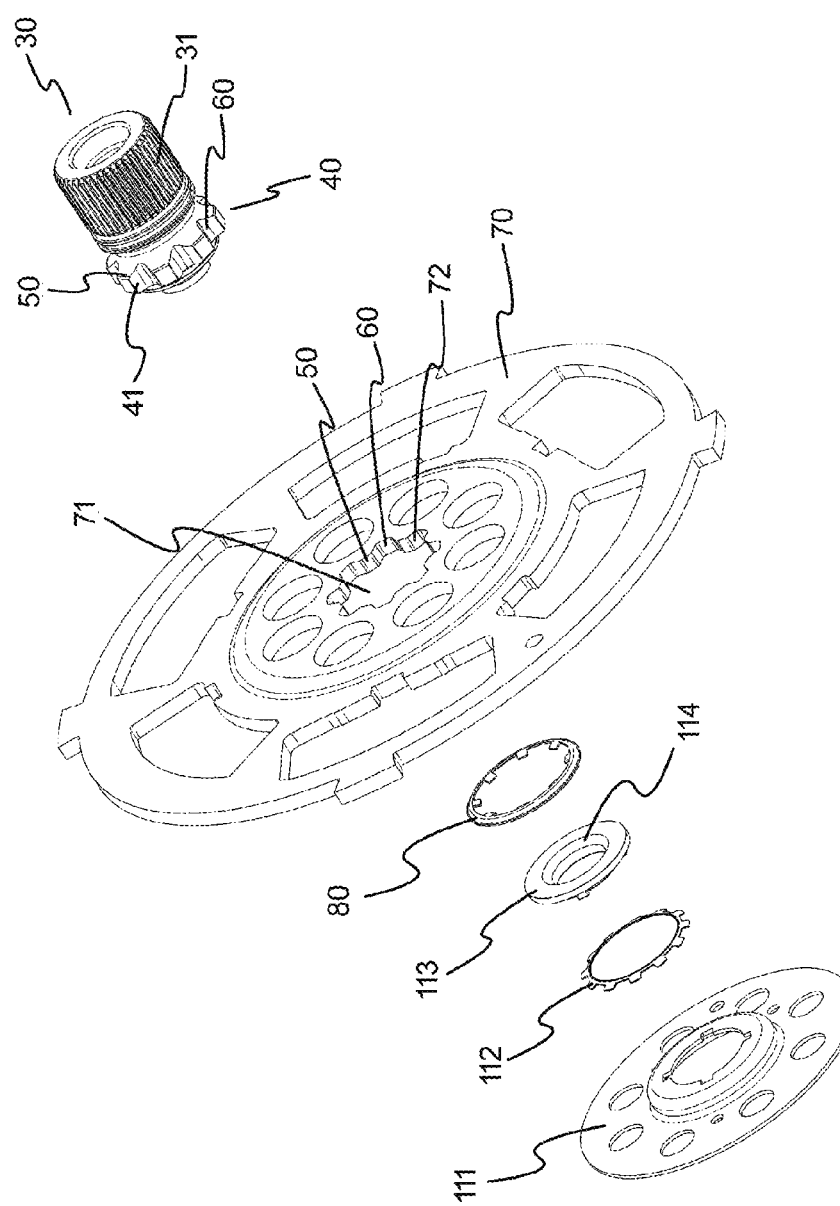
In FIG. 3, a representative exploded view of the subject matter powertrain mechanism is given.

As can be seen in FIG. 3, in a possible embodiment of the present invention, said connection hub (30) has a cylindrical form. There is at least one geared section (31) provided on a side of the connection hub (30). The powertrain mechanism (10) is connected to the gearbox through said geared section (31). On the side of the connection hub (30) facing the drive plate (70), there is at least one assembly section (40) for providing connection to the drive plate (70). In order to provide connection of the connection hub (30) to the drive plate (70), there is at least one assembly opening (71) provided in the vicinity of the center of the drive plate (70). There is at least one protrusion (50) and at least one recess (60) provided mutually on an outer wall (41) of said assembly section (40) and on an inner wall (72) of said assembly opening (71). Pluralities of protrusions (50) and recesses (60) are provided along the inner wall (72) and the outer wall (41). In a possible embodiment of the present invention, the protrusions (50) and the recesses (60) can be provided in trapezoid tooth form. In alternative embodiments, they can be provided in different forms like sinusoidal or triangular forms. The dimensions and forms of the protrusions (50) and of the recesses (60) are provided in a compliant manner to each other. Accordingly, the protrusions (50) are provided so as to be smaller than the recess (60) within a predetermined tolerance. Moreover, there is at least one movement gap (90) provided between the protrusion upper section (51), defined at the uppermost section of the protrusion (50), and the recess base (61) defined at the bottom section of the recess (60). In other words, in a different manner from the prior art where the assembly section (40) is fixed to the assembly opening (71) in a snap-fit manner, the assembly section (40) moves at least partially inside the assembly opening (71).

Figure 4:
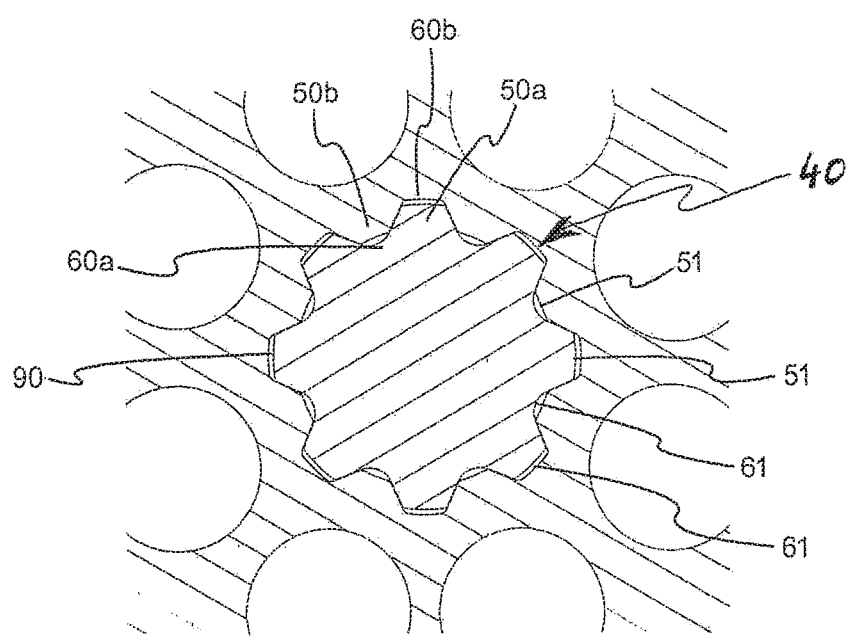
In FIG. 4, a representative detailed view of the subject matter powertrain mechanism is given.

As can be seen in FIG. 4, at the assembly section (40) of the connection hub (30), there are hub protrusions (50a) and hub recesses (60a) provided consecutively along the outer wall (41). In a similar manner, there are plate protrusions (50b) and plate recesses (60b) provided on the inner wall (72) of the assembly opening (71). Accordingly, when the connection hub (30) is connected to the drive plate (70), the hub protrusions (50a) are placed to the plate recesses (60b), and the plate protrusions (50b) are placed to the hub recesses (60a). In alternative embodiments of the present invention, the hub protrusions (50a) and the plate protrusions (50b) can be provided in different forms and dimensions. Accordingly, the corresponding plate recesses (60b) and the hub recesses (60a) are provided in suitable forms.

In a possible embodiment of the present invention, the hub protrusions (50a) at least partially extend in the direction of the width of the assembly section (40). In a possible embodiment of the present invention, the hub recesses (60a) at least partially extend in the direction of the width of the assembly section (40). In a possible embodiment of the present invention, the plate protrusions (50b) at least partially extend in the direction of the thickness of the drive plate (70). In a possible embodiment of the present invention, the plate recesses (60b) at least partially extend in the direction of the thickness of the drive plate (70).

In the subject matter powertrain mechanism, in a different manner from the prior art where the assembly section (40) is fixed to the assembly opening (71) in a snap-fit manner, the assembly section (40) moves at least partially inside the assembly opening (71).

As seen in FIG. 2, there is at least one channel (42) provided in the vicinity of the assembly section (40). Said channel (42) at least partially extends along the periphery of the connection hub (30). Thus, the channel (42) is provided on a side of the assembly section (40), and the geared section (31) is provided on the other side thereof. In other words, the channel (42) is provided on the side of the connection hub (30) facing the holder plate (11).

There is at least one chamfered section (43) provided in the vicinity of the end of the side of the connection hub (30) where the channel (42) is provided.

As seen in FIG. 2, while the connection hub (30) is assembled to the drive plate (70), the assembly section (40) is placed into the assembly opening (71). Afterwards, the drive plate (70) and the connection hub (30) are fixed to each other by means of at least one snap ring (80) placed into the channel (42). Thus, the removal of the connection hub (30) from the drive plate (70) is prevented or the movement of the connection hub (30) in axial direction inside the assembly opening (71) is prevented. Moreover, when axial force is applied to the connection hub (30), bending occurs thanks to the snap ring (80). By means of this, at least a section of the applied force is dampened, and force application onto the drive plate (70) is prevented.

In order to prevent contact of the connection hub (30) to the holder plate (11) or to the support plate (111), there is at least one annular friction element (113) positioned between the connection hub (30) and the support plate (111). The friction element (113) has an annular shape. On an annular inner edge of the friction element (113), there is at least one chamfer (114) provided in a compliant manner with the chamfered section (43) of the connection hub (30). When the connection hub (30) is mounted (or assembled) onto the holder plate (11), the chamfered section (43) seats to the chamfer (114) provided on the friction element (113). Moreover, there is at least one springy washer (112) provided between the friction element (113) and the support plate (111).

In said embodiment, thanks to the movement gap (90) between the assembly section (40) and the wall of the assembly opening (71), the connection hub (30) will have movement freedom. In other words, when the connection hub (30) is mounted to the assembly opening (71), it can at least partially move in the assembly opening (71). By means of this, the axial run-outs, which exist between a rotation axis of the crank shaft and a center axis $X_1$ of the drive plate (70), can be tolerated. The axial run-outs, which exist between a center axis of the holder plate (11) and a center axis of the gearbox shaft, are prevented. In other words, while movement is transferred from the holder plate (11) and from the fixation plate (12) to the drive plate (70), the drive plate (70) displaces at an amount equal to said movement gap (90), and it can continue rotational movement without being affected by the axial run-outs. Moreover, thanks to said embodiment, the undesired contact of the drive plate (70) to the other pieces in the powertrain mechanism (10) is prevented.

In an embodiment of the present invention, thanks to the chamfer (114) provided on the friction element (113) and the movement gap (90) provided between the drive plate (70) and the connection hub (30), limited angular run-out is permitted between a center axis $X_2$ of the connection hub (30) and the center axis $X_1$ of the drive plate (70). Meanwhile, since the snap ring (80) has a flexible structure, the permitted run-out amount and the movement of the connection hub (30) in the axial direction are delimited. By means of said embodiment, thanks to the powertrain mechanism (10), the vibrations in the direction of bending of the axis are not transferred to the gearbox shaft. Thus, the comfort of automobile is increased, and the lifetime of the powertrain mechanism (10) is extended.

The protection scope of the present invention is set forth in the annexed Claims and cannot be restricted to the illustrative disclosures given above, under the detailed description. It is because a person skilled in the relevant art can obviously produce similar embodiments under the light of the foregoing disclosures, without departing from the main principles of the present invention.

The invention claimed is:

1. A powertrain mechanism (10) for transmitting power from an internal combustion engine (2) to a gearbox (4) in a vehicle having the internal combustion engine (2), the powertrain mechanism (10) disposed between the internal combustion engine (2) and the gearbox (4) of the vehicle and comprising:
    at least one drive plate (70) having at least one assembly opening (71) provided in the vicinity of a center of the at least one drive plate (70);
    at least one connection hub (30) having an assembly section (40) placed into the at least one assembly opening (71);
    at least one protrusion (50) provided on one of an inner wall (72) of the at least one assembly opening (71) and an outer wall (41) of the assembly section (40);
    at least one recess (60) provided on another one of the inner wall (72) of the at least one assembly opening (71) and on the outer wall (41) of the assembly section (40);
    at least one movement gap (90) provided between at least one protrusion upper section (51) defined at an uppermost section of the at least one protrusion (50) and at least one recess base (61) defined at a lowermost section of the at least one recess (60);
    at least one channel (42) provided in the vicinity of the assembly section (40); and
    at least one snap ring (80) disposed in the at least one channel (42);
    the at least one protrusion (50) at least partially placed in the at least one recess (60).

2. The powertrain mechanism (10) according to claim 1, wherein the snap ring (80) is stopped onto inner wall of the at least one channel (42) from one side, and wherein the snap ring (80) is stopped onto the drive plate (70) from the other side.

3. The powertrain mechanism (10) according to claim 2, wherein each of the at least one protrusion (50) and the at least one recess (60) has a trapezoid tooth form.

4. The powertrain mechanism (10) according to claim 1, comprising a plurality of protrusions (50) and recesses (60).

5. The powertrain mechanism (10) according to claim 4, wherein the protrusions (50) and the recesses (60) are provided consecutively on the inner wall (72) and on the outer wall (41).

6. The powertrain mechanism (10) according to claim 5, wherein each of the protrusions (50) and each of the recesses (60) has a trapezoid tooth form.

7. The powertrain mechanism (10) according to claim 4, wherein each of the protrusions (50) and each of the recesses (60) has a trapezoid tooth form.

8. The powertrain mechanism (10) according to claim 1, wherein the at least one protrusion (50) and the at least one recess (60) are provided in trapezoid tooth form.

9. The powertrain mechanism (10) according to claim 1, wherein the drive plate (70) is positioned between a holder plate (11) facing the engine, and a fixation plate (12) facing the gearbox.

10. The powertrain mechanism (10) according to claim 9, wherein at least one inertia plate (13) is provided between the holder plate (11) and the fixation plate (12).

11. The powertrain mechanism (10) according to claim 9, further comprising at least one support plate (111) connected to the holder plate (11).

12. The powertrain mechanism (10) according to claim 9, further comprising at least one friction element (113) positioned between the holder plate (11) and the at least one connection hub (30).

13. The powertrain mechanism (10) according to claim 12, wherein the at least one connection hub (30) has at least one chamfered section (43) facing the at least one friction element (113).

14. The powertrain mechanism (10) according to claim 12, wherein the at least one friction element (113) has at least one chamfer (114) facing the connection hub (30).

15. The powertrain mechanism (10) according to claim 14, wherein the at least one chamfer (114) is provided on an annular inner edge of the at least one friction element (113), and wherein the at least one friction element (113) has an annular shape.

16. The powertrain mechanism (10) according to claim 1, wherein each of the at least one protrusion (50) and the at least one recess (60) has a trapezoid tooth form.

* * * * *